UNITED STATES PATENT OFFICE 2,504,962

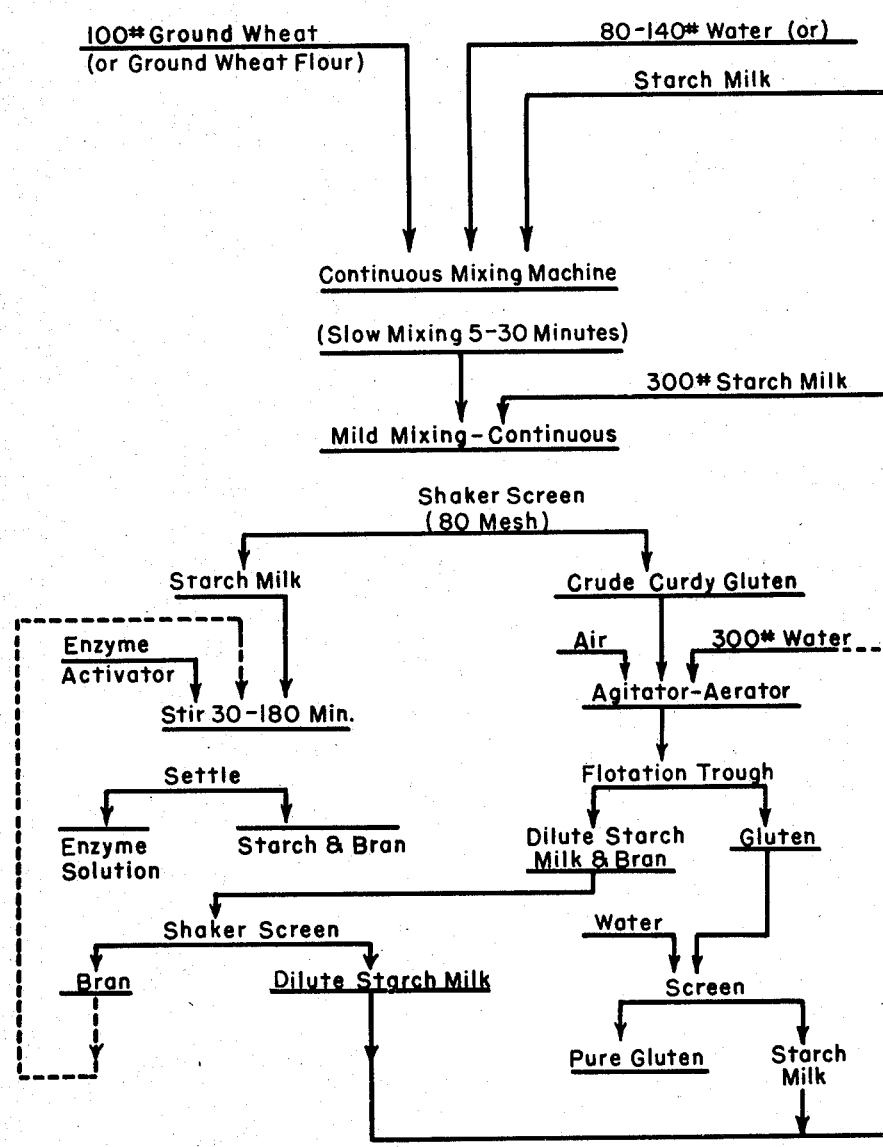

SEPARATION OF STARCH FROM WHEAT FLOUR

Everette M. Burdick, Peoria, Ill., assignor to the United States of America as represented by the Secretary of Agriculture Application December 8, 1944, Serial No. 567,296

8 Claims. (Cl. 127—67)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the manufacture of wheat starch and gluten.

The chief problem in the manufacture of starch and gluten from wheat and granular wheat flour lies in the difficulty of separating these components due to the dough-forming properties of the gluten.

Prior art processes are based upon the use of fermentation or mechanical expedients and are not wholly satisfactory for various reasons. In some of the prior art processes, a great deal of time is consumed, and the valuable gluten is lost or degraded. This is especially true in fermentation processes which also have the disadvantage that they create offensive odors and involve difficulties in the disposal of the effluents.

Although mechanical methods are preferred over fermentation methods since the former permit recovery of the gluten, the prior art mechanical methods are very tedious. The best mechanical processes of the prior art require the use of high-priced starting materials and result in low yields of first-grade starch with relatively large yields of second-grade starch, the latter being contaminated with gluten, which is difficult to separate, even with a centrifuge.

One object of the present invention is the separation of wheat and granular wheat flour components in greater quantities and more economically than is possible with processes of the prior art.

Another object of the invention is to effect a more complete separation and recovery of the components (starch, gluten, bran, enzymes) of wheat and granular wheat flour in a higher state of purity than is possible with prior processes.

A valuable feature of the invention resides in the recovery of protein for subsequent alcohol fermentation of the deglutinized wheat or granular flour which may then be fermented without loss of alcohol production, and at the same time, the enzymes of the wheat or granular wheat flour may be utilized to reduce the amount of malt or other saccharifying agent required.

In general, the process of this invention involves the following steps:

1. Formation of a batter by mixing ground whole wheat and/or granular wheat flour with water.
2. Dilution of the batter with additional water.
3. Screening of the diluted batter.
4. Vigorous agitation and aeration of the screenings (crude gluten) with additional water.
5. Flotation to effect gluten separation.
6. Screening of the starch-bran slurry residue.
7. Separation of an enzymatic extract from the deglutinized grain slurry.
8. Recycling of the dilute starchy waters.

In the accompanying drawing, there is shown a flow diagram of the process in more detail.

The batter is formed by mixing whole ground wheat or granular wheat flour with 80–140 percent of its weight of water. The amount of water required will vary with the raw material produced from one variety of wheat to another and is best determined by a preliminary test on the raw material being used. The time of mixing will vary from 5 to 30 minutes, depending upon the rate and type of agitation, fineness of grind, grain to water ratio, temperature, and the type of raw material used.

The temperature during the mixing may vary considerably without harmful effect. The physical characteristics of the gluten are somewhat altered by changes in temperature. In general, the temperature may vary from freezing to just below the gelatinization temperature of the starch, but if the enzymes are to be utilized, the best temperature range is 20°–40° C.

The chief object of forming the batter is to swell or hydrate the gluten completely. The more thoroughly this step is carried out, the more complete will be the recovery of gluten.

It is necessary to mix thoroughly the wheat material and water, taking care that no lumps or balls form during this operation. As the mixing continues, the gluten swells and tends to coalesce. The batter smooths out during the mixing. Too much mixing should be avoided in order to prevent the formation of large gluten lumps and strings which are difficult to handle in subsequent operations. This step may be easily carried out in a continuous batter mixing machine.

In the second step, the batter is diluted with water so that the ratio of water to grain is between 3 and 5 to 1. This dilution is best accomplished by adding the batter to water with mild agitation. If too much water is used or if too violent agitation is used in this step, the gluten will separate in the form of strings or large clumps, which are undesirable because of the mechanical difficulties which they present. During this step, some of the starch is freed from the gluten masses in milk form, which permits the successful operation of the next step.

The third step of the process comprises passing the diluted batter over a fine screen, preferably a shaking screen. Although the fineness of the screen does not appear to be too critical, an 80-mesh wire cloth type screen has been found to be satisfactory. The screen should be fine enough to retain the fibrous material as well as the gluten. A shaking wire cloth screen is to be preferred since this type has little or no tendency to be clogged by the gluten. A crude starchy-gluten-bran mass passes over the top of the screen while a concentrated starch milk passes through the screen. This crude starch milk contains almost all the starch originally present in the wheat or granular wheat flour, especially when the diluted starch waters are reused to make up the original batter and for the dilution of this batter. The concentrated starch milk may be purified by any of the conventional processes for the manufacture of wheat starch or it can be used without purification to prepare fermentation mash. Where the gluten produced is tough and shows an increased tendency to hold starch, the starch-gluten-bran mass may be rescreened under a spray of water to effect a better separation of the starch.

In the fourth step of the process, the crude starch-gluten-bran mass obtained by the screening operation is further treated by either passing the mass and water directly into a high-speed agitator-aerator or first mixing the mass with water before passing it into the machine. The purpose of this agitation and aeration is to beat thoroughly the starch and bran from the gluten and produce a glutenous foam by finely dispersing the air in the mass. A suitable agitator-aerator machine for this purpose comprises a closed horizontal cylindrical vessel, longitudinally corrugated on the inside of the shell, and fitted with a high-speed horizontal shaft on which metal beaters are fixed. The closed-type machine permits continuous operation and complete control of the amount of air which is introduced into the mass from any convenient source. The time of mixing and amount of air introduced are dependent upon the speed and efficiency of the agitator-aerator. The mixture emerges from the machine in the form of a thick frothy mass. It is possible to pass a wheat or granular wheat flour slurry through such an operation and obtain a partial separation of starch and gluten, thus eliminating steps 2 and 3, but the proportion of gluten floated is very small (25-50 per cent) in comparison to the total amount present. Also, the floating gluten contains much starch and bran. In this separation, it is important to alter the original gluten to starch ratio, which is readily accomplished by the first three steps in this process. This makes possible the complete recovery of the gluten.

The frothy mass produced by the agitation and aeration is passed into a flotation trough or tank in which the gluten rises to the surface, in the form of a froth, where it can be skimmed off. A relatively pure gluten is produced in this operation. However, it is desirable to purify it further by passing it over a screen under a spray of water to wash out traces of starch remaining. At this point, the major portion of fresh water should enter the process. The purified gluten can now be processed by any conventional method. If proper agitation and aeration have been effected in the preceding step, the foam is sufficiently stable to produce a good flotation of the gluten almost free of bran and starch, yet unstable enough to break within a few minutes (5-10) after reaching the surface. The bran and starch settle rapidly to the bottom of the trough or tank and may be continuously removed.

In the sixth step, the bran is removed from the thin starch milk by passing the dilute slurry over a fine mesh screen. The bran can now be removed or returned to the previous point in the process where the starch slurry is concentrated. The latter is desirable if the enzymes are to be separated or a distillery mash is to be made from the starch. The starch-bran mashes can be handled in a distillery much more readily than a mash containing gluten because the gluten tends to foul the steam jets in the cookers as well as the cooler tubes, the still plates, and the recovery system in general. The screened dilute starch milk is used as make-up water, since the small amount of additional starch does not materially affect the primary separation obtained in the third step of the process. The bran need not be mixed with the concentrated starch milk if a pure starch is desired, but in any event, it must be removed prior to reuse of the water in the process.

If it is desired to utilize the enzymes of the wheat or granular wheat flour, for example, in the preparation of a saccharified mash for fermentation, step seven may be employed. The aqueous extract obtainable from the concentrated starch milk and bran mixture upon settling contains active enzymes which may be utilized to replace partially those necessary to bring about conversion of starch to fermentable sugars. However, the enzymatic activity of such an extract or supernatant can be markedly increased by application of step seven, which comprises treating the starch-bran slurry with enzyme activators (sulfites, sulfides, cyanides, thiocyanates, proteolytic enzymes, and their activators) for a short period before settling. Sulfites and bisulfites are preferred for this activation because of their efficiency in activating the so-called bound enzymes of wheat, and also because of their low cost. It is thus possible to obtain the enzymes of the wheat after the gluten has been removed. The gluten of wheat tends to be dissolved by their materials and thus loses some of its valuable characteristics. This unwanted action is circumvented by adding the enzyme activator after deglutinizing the grain. The enzymatic extract is rich in beta-amylase, but must be supplemented by alpha-amylase in order to obtain a satisfactory conversion of starch to fermentable sugars. The composition of wheat varies greatly from one variety to another, which is especially true of the starch, gluten, and enzyme content.

To complete the process and achieve a complete recovery of the starch, it is necessary to reuse the dilute starch-bearing waters. This is possible because the use of these dilute starch solutions in place of water in the initial steps does not materially affect their successful operation. It is preferred to add the major portion of fresh water late in the process, that is, to wash the materials, like the gluten, which contains small amounts of starch, with clear water and then use the washings to make up the concentrated batter and also to dilute this batter.

In order to illustrate the process of this invention, the following example is given:

To 30 lbs. of water, 25 lbs. of ground wheat was added. (The exact amount of water may vary from 0.8-1.4 times the weight of the grain and is best determined by a preliminary test.) The mixture was stirred until a stiff smooth batter resulted, which ordinarily takes about 10 minutes. This batter was then diluted by adding it to 70 lbs. of water with mild agitation. The resulting diluted batter was then passed over an 80-mesh shaking screen to separate a crude starch-gluten-bran mass from a starch milk, the concentration of which was about 7° Baumé. The crude-gluten-bran mass was then passed directly into an agitator-aerator along with 75 lbs. of water.

After being thoroughly beaten and aerated, the resulting frothy mixture was allowed to settle in a large trough. Within about 10 minutes, the gluten formed a layer upon the surface. The gluten was skimmed off and washed by passing it over a screen under a spray of water. The gluten yield was 10 lbs. of dry weight per 100 lbs. of raw material and was essentially equal to the total gluten originally present in the grain. Analysis showed the gluten to be 85 percent pure and to contain only 3 percent of starch. The slurry remaining after skimming off the gluten was screened to separate the bran. (The bran at this point may be added back to the concentrated starch milk if a fermentation process is contemplated.) The washings and dilute starch milk were retained for use as make-up water in subsequent runs. Twenty-five grams of sodium sulfite was then added to the starch-bran slurry which was stirred for 45 minutes. After settling, the enzymatic solution was readily separated.

Having thus described my invention, I claim:

1. The method of separating starch and gluten from whole wheat and wheat flours comprising forming a batter of the wheat material with sufficient water to hydrate the gluten completely, increasing the gluten to starch ratio of the batter by leaching it with about 3 to 5 parts water and separating the resulting starch milk by screening, aerating the gluten of the resulting mass and separating the aerated gluten from the remaining components by flotation.

2. The method of separating starch and gluten from whole wheat and wheat flours comprising forming a batter of the wheat material with sufficient water to hydrate the gluten completely, leaching and removing starch from the batter with about 3 to 5 parts water to increase the gluten to starch ratio of the batter, aerating the gluten of the resulting mass and separating the aerated gluten from the remaining components by flotation.

3. The process of treating whole wheat and wheat flour comprising forming a batter of the wheat material with sufficient water to hydrate the gluten completely, diluting the batter with about 3 to 5 parts water and screening it to remove starch milk, aerating the screenings in the presence of additional water to foam the gluten, thence separating the gluten foam by flotation and removing it from the remaining starch-bran slurry, followed by separating the bran from the starch in the slurry.

4. The process of activating enzymes in whole wheat and wheat flour and extracting them without denaturing the gluten comprising forming a batter of the wheat material with sufficient water to hydrate the gluten completely, diluting the batter with about 3 to 5 parts water and screening it to remove starch milk, aerating the screenings in the presence of additional water to foam the gluten, thence separating the gluten foam by flotation and removing it from the remaining starch-bran slurry, adding an agent to the slurry which will activate the enzymes therein, permitting the slurry to settle, and removing the aqueous portion thereof as an enzymatic extract.

5. The method of separating starch from wheat flour comprising forming an aqueous batter of wheat flour, diluting the batter with water to form a slurry, separating the starch milk by screening, aerating the gluten of the resulting mass and separating the aerated gluten from the remaining components by flotation.

6. The method of separating starch from wheat flour containing bran, comprising forming an aqueous batter from the wheat flour, diluting the batter with water to form a slurry, separating the starch milk by screening, leaving a starch-gluten-bran mass, aerating and beating the said mass, with water, to beat the starch and bran from the gluten and produce a glutenous foam, and separating the aerated glutenous foam from the remaining components by flotation.

7. The method of separating gluten from wheat flour, comprising forming an aqueous batter from wheat flour, diluting the batter with water to form a slurry, separating the slurry by screening into starch milk and gluten residue, aerating said residue in water, and separating the gluten floating on the water.

8. The method of separating starch from wheat flour comprising forming a batter by adding wheat flour to water, the water being 80 to 140 percent of the flour by weight, and mixing, continuing the mixing to hydrate the gluten and form a smooth batter, diluting the batter with water, so that the ratio of water to grain is between 3 and 5 to 1, with mild agitation controlled to avoid separation of the gluten in the form of strings and large clumps, the dilution freeing some of the starch from the gluten masses in milk form, passing the diluted batter over a screen, the starch milk passing through the screen, a crude starchy-gluten-bran mass passing over the top of the screen, agitating and aerating the starch-gluten-bran mass in water to finely disperse the air in the mass and beat the starch and bran from the gluten and so produce a thick frothy mass, subjecting the frothy mass to a flotation step in which the gluten rises to the surface of the water and is skimmed off, the bran and starch settling, passing the gluten over a screen under a spray of fresh water to wash traces of starch from it, separating the said bran from the starch milk, and recycling the wash water and starch milk to the batter forming step.

EVERETTE M. BURDICK.

REFERENCES CITED

The following references are of record in the file of this patent:

UNITED STATES PATENTS

| Number | Name | Date |
|---|---|---|
| 235,053 | Gassaway | Nov. 30, 1880 |
| 560,699 | Firmenich | May 26, 1896 |
| 1,221,990 | Holden | Apr. 10, 1917 |
| 2,124,284 | Boie | July 19, 1938 |
| 2,132,251 | Wagner | Oct. 4, 1938 |
| 2,138,274 | Greenfield | Nov. 29, 1938 |
| 2,388,902 | Callaghan et al. | Nov. 13, 1945 |

OTHER REFERENCES

Shewfelt, "Separation of Starch and Gluten from Wheat Flour," Canadian Chem. and Process Ind., July 1944, pages 502 and 519.